(12) United States Patent
Kaiser et al.

(10) Patent No.: US 7,126,487 B2
(45) Date of Patent: Oct. 24, 2006

(54) CIRCUIT AND METHOD FOR PRIORITIZATION OF HAZARDOUS CONDITION MESSAGES FOR INTERCONNECTED HAZARDOUS CONDITION DETECTORS

(75) Inventors: Timothy D. Kaiser, Plain City, OH (US); Rodney Wayne Scuka, Dublin, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 194 days.

(21) Appl. No.: 10/966,820

(22) Filed: Oct. 15, 2004

(65) Prior Publication Data

US 2006/0092012 A1  May 4, 2006

(51) Int. Cl.
*G08B 17/10* (2006.01)

(52) U.S. Cl. ............... 340/628; 340/531; 340/538; 340/632

(58) Field of Classification Search ........... 340/628, 340/629, 630, 517, 632, 635, 531, 533, 538
See application file for complete search history.

(56) References Cited

U.S. PATENT DOCUMENTS

| | | | | |
|---|---|---|---|---|
| 3,665,461 A | * | 5/1972 | Gnagi et al. | 340/509 |
| 5,627,515 A | * | 5/1997 | Anderson | 340/517 |
| 5,705,979 A | * | 1/1998 | Fierro et al. | 340/517 |
| 5,898,369 A | * | 4/1999 | Godwin | 340/539.26 |
| 6,040,769 A | * | 3/2000 | Payne | 340/506 |
| 6,353,395 B1 | * | 3/2002 | Duran | 340/691.1 |
| 6,472,980 B1 | * | 10/2002 | Jen et al. | 340/506 |
| 6,611,204 B1 | | 8/2003 | Schmurr | |
| 6,791,453 B1 | * | 9/2004 | Andres et al. | 340/286.01 |

* cited by examiner

*Primary Examiner*—Toan N. Pham
(74) *Attorney, Agent, or Firm*—Reinhart Boerner Van Deuren P.C.

(57) ABSTRACT

An interface circuit and method for use in interconnected hazardous condition detectors is provided. This circuit and method prioritizes the various hazardous condition alarms to ensure that only the highest priority or greatest threat alarm is sounded when such a condition is detected. In this way a lower priority alarm that may be sounding will be switched to a higher priority alarm so that all interconnected detectors that have the capability will sound the higher priority alarm. This will reduce occupant confusion during a hazardous condition. The circuit and method also provides the ability to silence all interconnected detectors except for those sensing the hazardous condition to allow the occupant to locate the triggering alarm, and there for the location of the sensed hazardous condition.

21 Claims, 4 Drawing Sheets

CIRCUIT AND METHOD FOR PRIORITIZATION OF HAZARDOUS CONDITION MESSAGES FOR INTERCONNECTED HAZARDOUS CONDITION DETECTORS

FIELD OF THE INVENTION

The present invention relates generally to interconnected hazardous condition detector systems, and more particularly to systems and methods for communicating hazardous condition information between the interconnected hazardous condition detectors.

BACKGROUND OF THE INVENTION

As the life-saving benefits of hazardous condition detectors are recognized, their usage continues to expand. Such hazardous condition detectors include smoke detectors, heat detectors, carbon monoxide detectors, flammable vapor detectors, combination units, etc. Indeed, the installation of such detectors is mandated in many states by building code for all new construction of single and multi-family dwellings, office buildings, schools, etc. Further, many areas also require that such detectors be installed in existing homes before they may be sold.

Because many such structures include multiple floors, rooms, or areas on or in which a remotely located hazardous condition detector may not be heard, it is recommended that multiple hazardous condition detectors be located throughout the structure or dwelling to increase the likelihood of early detection of a hazardous condition. Such early detection is a direct factor in the survivability of the occupants within the dwelling or structure.

In a typical single family dwelling having a basement and two stories, at least one hazardous condition detector should be placed on each floor of the dwelling. That is, at least one detector should be placed in the basement, on the first floor, and on the second floor. In this way, a hazardous condition that originates in the basement may be detected sooner than if the only hazardous detector were located on the second floor. Indeed, even in single floor plan dwellings or structures, it is recommended to include multiple detectors at various locations. For example, a hazardous condition detector may be located in the utility room housing the furnace, water heater, etc., one in the kitchen and one in each of the bedrooms or in the hallway by the bedrooms. Regardless of the configuration, however, the use of multiple hazardous condition detectors provides the advantage of detecting the hazardous condition early to allow the occupants as much time as possible to avoid danger.

While the use of multiple hazardous condition detectors at different locations throughout a dwelling or structure increases the likelihood of detecting a hazardous condition early, the layout of the dwelling or structure may well prevent an occupant from hearing the alarm of the hazardous condition detector located in proximity to the hazardous condition when it sounds. For example, if the hazardous condition detector in the basement of a two-story single family dwelling were to detect a hazardous condition and sound its alarm, the occupants who may be asleep on the second story may not be able to hear the alarm sounding in the basement. Indeed, many dwellings are constructed with insulation between the stories for the very purpose of stopping the transmission of noise therebetween. However, such sound insulation may well detract from the advantage of installing multiple hazardous condition detectors throughout the dwelling. If the hazardous condition continues to expand, the other detectors in the dwelling or structure will eventually detect this hazardous condition and hopefully alert the occupant of the existence of such a condition in time for the occupant to escape the danger.

To overcome this problem, the hazardous condition detectors may be interconnected or networked together utilizing a wired connection. In such installations the hazardous condition detectors communicate among themselves via a single wire in a three wire interconnect, the other two wires providing electric power to the units. In such an installation the detecting hazardous condition detector sounds its alarm and transmits a hazardous condition detected signal to the other interconnected hazardous condition detectors. These detectors then sound their alarm to notify the occupant of the detected hazardous condition within the dwelling.

While the sounding of the alarm of each of the interconnected hazardous condition detectors will increase the likelihood that the occupants will be advised of the hazardous condition, it is imperative that the wrong alarm is not sounded. That is, it is common for many dwellings or structures to include multiples types of hazardous condition detectors, each having a distinctive alarm pattern to alert the user to the different types of detected hazardous conditions. For example, a typical single family dwelling may include both smoke and carbon monoxide detectors. In such an installation, the detection of smoke must result in only smoke alarms being sounded throughout the dwelling. That is, no carbon monoxide alarm signal should be sounded by a carbon monoxide detector because smoke is detected by one of the other hazardous condition detectors. The converse is also true.

If each different type of detector were to sound its alarm, the occupant would most likely become confused, and may well take the wrong action. For example, if both smoke and CO alarms are sounding when a fire is detected, the occupant may well believe that CO has been sensed and take time to open windows to let in fresh air instead of fleeing the structure. In view of this requirement, only the hazardous condition detectors that are capable of sounding the alarm corresponding to the detected hazardous condition should sound such an alarm. The other hazardous condition detectors that are not capable of sounding an alarm that corresponds to the detected hazardous condition must remain silent to avoid confusing the occupants as to the detected hazard.

As indicated above, the typical hazardous detector system interconnect utilizes a three wire system. Two of the wires are used to provide AC power to the detectors, while the third is used to transmit the remote alarm signal. This interconnect system was developed originally for the interconnection of smoke detectors. For simplicity, the interconnected smoke detectors simply apply a DC signal on the interconnect of at least about 3.0 Vdc. When the other smoke detectors sense this DC level on the interconnect, they sound their alarm. To prevent high frequency transients and 50 and 60 Hz modulation signals (associated with input AC power) from triggering the local alarm, the smoke detectors typically include an interconnect filter such as illustrated in FIG. 1.

Briefly described, the interconnect filter of FIG. 1 includes a resistor and capacitor that serve as a low-pass filter, i.e., to generally allow only low frequency signals to reach the smoke alarm sensing circuit portion from the interconnect line. A constant (DC) voltage signal present on the interconnect line charges the capacitor through the resistor. When the voltage at the capacitor reaches the predetermined threshold value (for example, at least about 3.0 volts at the interconnect port) an alarm indicator is triggered. The Zener diode clamps any inappropriate voltage spikes across the capacitor to a sufficiently low level to help prevent damage to alarm circuit portion.

With the relatively recent addition of carbon monoxide (CO) detectors in the home, a system was needed to allow such detectors also to be interconnected while ensuring that the smoke detectors would not erroneously sound their alarm when CO was sensed. While a separate interconnect could have been used only for the CO detectors, such an approach greatly increases the cost and complexity of the interconnect wiring needed in the dwelling. Further, the recent advent of combination detectors, providing both CO and smoke detection in a single package, further makes such an approach unworkable.

One system of providing communication between hazardous condition detectors that allows communication of both smoke and CO alarm signals on the single signal wire of the interconnect, and that ensures that erroneous alarms are not triggered is provided in U.S. Pat. No. 6,611,204, entitled "Hazard Alarm, System, and Communication Therefore", the teachings and disclosure of which are hereby incorporated in their entireties by reference thereto. This system provides a digital signal on the interconnect wiring signal line when a carbon monoxide hazard has been detected. Since the typical smoke detector filters high frequency signals, the digital signal indicative of CO is not seen by such smoke detectors as a command to sound their alarm. Similarly, the presence of a DC voltage signal on the interconnect signal wire is not read by the CO detectors as a command to sound their alarm.

While such a system provides a significant advancement in the art, it is still possible for both smoke and CO alarms to sound at the same time. This condition may result when both smoke and CO are detected by the detectors, a condition that may be present during a real fire. Since the sounding of both types of alarms may be confusing to the occupants, potentially causing them to take the wrong or inappropriate action, this is to be avoided.

Further, once a hazardous condition has been detected and all interconnected alarms are sounded, the occupant may be unaware of the actual location of the hazardous condition that originated the alarming. Without such information, the occupants may well place themselves in danger by going toward the hazard or by taking an escape route that would increase their risk of injury. Unfortunately, with all of the interconnected hazardous condition detectors sounding their alarm, the occupants may not be able to make an informed decision of which escape route to take.

In view of the above, there exists the need in the art for a system and method of communication between hazardous condition detectors that distinguish different detected hazardous conditions and that prioritizes the different hazardous condition alarms while communicating on the existing interconnect system. This is needed so that the occupants may be quickly and properly advised of the most serious threat to their safety and well being. There also exists a need in the art for a system and method of communication between hazardous condition detectors that allows an occupant to hush all of the interconnected detectors' alarms except for the detecting detector so that the location of the hazardous condition may more easily and safely be determined.

BRIEF SUMMARY OF THE INVENTION

In view of the above, it is an object of the present invention to provide a new and improved remote hazardous condition detector interconnect communication method and circuitry that distinguish different detected hazardous conditions on the interconnect wiring. It is a further object of the present invention to provide a new and improved remote hazardous condition detector interconnect communication method and circuitry that ensures proper prioritization of hazardous condition messages communicated on the interconnect. Additionally, it is a still further object of the present invention to provide a new and improved remote hazardous condition detector interconnect communication method and circuitry that allows an occupant to easily and safely identify the location of the detected hazardous condition. Additionally, it is an object of the present invention to provide a new and improved remote hazardous condition detector interconnect communication method and circuitry that is compatible with existing hazardous condition detector interconnect wiring. Still further, it is an object of the present invention to provide a new and improved remote hazardous condition detector interconnect communication method and circuitry that accommodates legacy smoke detectors, CO detectors, and combination units.

In one embodiment of the present invention, an interface circuit is provided that can both source and read information from a hazardous condition detector interconnect. This interface circuit operates to automatically prioritize the alarming of the interconnected hazardous condition detectors. This ensures that the most serious threat is signaled by each of the interconnected hazardous condition detectors regardless of other sensed hazards within the system. In a preferred embodiment, the prioritization of the hazardous condition messages provided to the interconnect is accomplished by utilizing various voltage levels to signify different hazardous conditions. Preferably the highest voltage signal supplied to the interconnect signifies a smoke alarm, while a lower voltage signifies a carbon monoxide alarm. In this way, the provision of a smoke alarm signal on the interconnect will swamp or override a carbon monoxide alarm that may also be provided on the interconnect. In this way, the connected hazardous condition detectors will all signal a smoke alarm condition.

In a preferred embodiment of the interface circuitry of the present invention, circuitry to provide a trigger alarm locate function is also provided. When activated, this circuitry pulls down the interconnect voltage below any hazardous condition detector signal. When such a condition is sensed by the interconnected hazardous condition detectors, they will silence their alarms that have been generated as a result of reading a signal from the interconnect. However, if these interconnected detectors are actually sensing a hazardous condition, they will continue to sound their alarm. This circuitry and functionality allows a user to silence all of the interconnected detectors except for the one or ones that are actually sensing a hazardous condition to allow the user to locate the hazardous condition. They will then be able to choose an appropriate escape route or other appropriate measures based on the detected hazard and location thereof.

In a preferred method of the present invention an interconnected hazardous condition detector provides a voltage signal at a first magnitude to the signal wire of the three-wire interconnect when a first hazardous condition is detected. For multiple hazardous condition detectors, the method also includes providing a second voltage signal at a second magnitude when a second hazardous condition is detected.

Preferably, the method provides for the step of prioritization of the hazardous condition messages. Such prioritization is accomplished in a preferred embodiment of the method of the present invention by ensuring that the voltage magnitude for the highest priority message is higher than any other voltage magnitude for any lower priority messages that may be generated.

A preferred embodiment of the present invention includes the step of silencing the alarms of the interconnected hazardous condition detectors that are not detecting a hazardous condition to allow the user to locate the source of the hazardous condition alarm. In a highly preferred embodiment this step comprises the step of lowering the voltage magnitude on the interconnect to a magnitude below the lowest priority hazardous condition signal. This step preferably comprises the step of grounding the interconnect signal line.

In a non-detecting hazardous condition detector, the method of the present invention comprises the steps of sensing a voltage magnitude on the interconnect signal line, determining which hazardous condition alarm is signaled by this sensed magnitude, and sounding the appropriate hazardous condition alarm. Preferably, the method also includes the step of determining that the sensed voltage magnitude is lower than a lowest priority hazardous condition signal and silencing the hazardous condition alarm. Such step of silencing does not apply if the receiving hazardous condition detector is also detecting a hazardous condition. In this case, the preferred method of the present invention includes the step of sounding the alarm associated with the detected hazardous condition.

Still further, a preferred embodiment of the present invention for a hazardous condition detector that is currently detecting a hazardous condition comprises the step of sensing a voltage magnitude on the hazardous condition detector interconnect signal line of a magnitude indicative of a higher priority hazardous condition than the hazardous condition currently being sensed, and silencing the current alarm for the sensed hazardous condition and sounding the appropriate hazardous condition alarm for the higher priority hazardous condition indicated by the voltage magnitude on the interconnect signal line.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
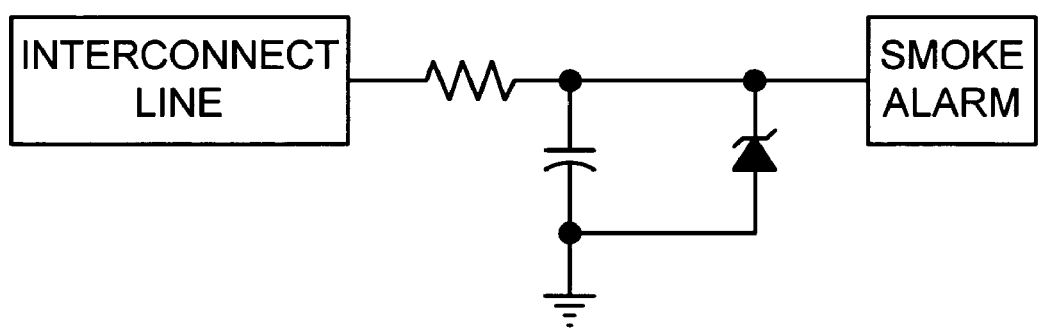
FIG. 1 is a schematic representation of a typical smoke alarm interconnect filter.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Because every additional second of notice that an occupant has of the existence of a hazardous condition increases the occupants' chance of escaping danger, the use of multiple hazardous condition detectors throughout a dwelling or other structure is highly desirable as discussed above. Indeed, complete coverage protection is achieved by installing an appropriate hazardous condition detector in every room of a dwelling. Smoke detectors should be installed in accordance with the National Fire Protection Associations Standard 72 (National Fire Protection Association, Battery March Park, Quincy, Mass. 02269). The NFPA standard identifies the minimum requirement for locating smoke alarms in family living units. It states: "2-2.1.1.1 smoke alarms shall be installed outside of each separate sleeping area in the immediate vicinity of the bedrooms and on each additional story of the family living unit including basements and excluding crawl spaces and unfinished attics. In new construction, a smoke alarm also shall be installed in each sleeping room." Further, Section 2-2.2.1 states that "in new construction, where more than one smoke alarm is required by 2-2.1, they shall be so arranged that operation of any smoke alarm shall cause the alarm in all smoke alarms within the dwelling to sound."

The NFPA, 1993 Addition, Appendix A, however, clearly points out that "the required number of smoke alarms (as defined in the paragraphs above) may not provide reliable early warning protection for those areas separated by a door from the areas protected by the required smoke alarms. For this reason, it is recommended that the house holder consider the use of additional smoke alarms for those areas for increased protection. The additional areas include: basement, bedrooms, dining room, furnace room, utility room, and hallways not protected by the required smoke alarms."

Further, the California State Fire Marshal states that the minimum number of required smoke alarms is not enough to give the earliest warning under all conditions. The California State Fire Marshal states that "early warning fire detection is best achieved by the installation of fire detection equipment in all rooms and areas of the household as follows: "a smoke alarm installed in each separate sleeping area (in the vicinity, but outside the bedrooms), and heat and smoke alarms in the living rooms, dining rooms, bedrooms, kitchens, hallways, attics, furnace rooms, closets, utility and storage rooms, basements and attached garages."

It is clear that the earliest warning of a developing fire is best achieved by the installation of smoke alarms in all rooms and areas of the residence. Accordingly, the resident should install smoke alarms in every room of the residence, including basements and finished attics, even though this is not required by the typical code or standard. In addition, it is recommended that the homeowner interconnect all of the hazardous condition detectors, including smoke detectors, CO detectors, etc. that are capable of being interconnected. Further, it is also recommended that a minimum of two smoke alarms be installed in every home, no matter how small the home (including efficiency apartments). Such maximum coverage can be achieved by installing smoke alarms and other hazardous condition detectors in both required and recommended locations as illustrated and described below.

Figure 2:
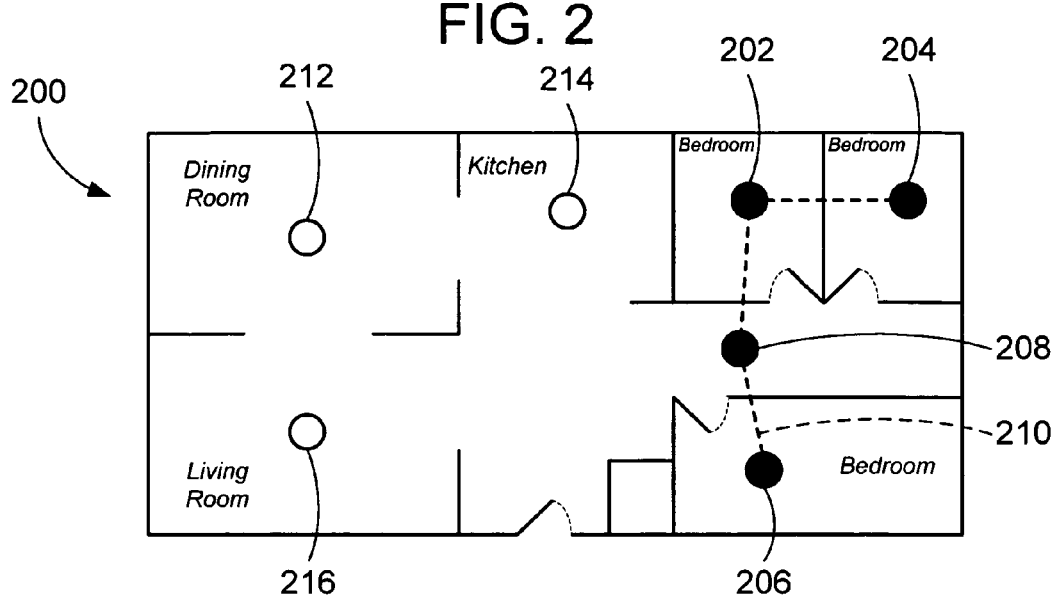
FIG. 2 is an exemplary smoke detector placement diagram for a single floor plan home.

For new homes the NFPA requires AC-powered, interconnected smoke alarms be installed each bedroom, outside each bedroom area, and on every level of the home. The NFPA also requires a minimum of two AC-powered, interconnected smoke alarms in any new construction home regardless of size. FIG. 2 illustrates a single story residence/apartment/mobile home 200 that includes the NFPA required smoke detectors in each of the bedrooms (detectors 202, 204, and 206) and outside the sleeping area (detector 208). As may be seen from this FIG. 3, each of the smoke detectors 202–208 are interconnected (as shown by dashed line 210). In addition to these required smoke detectors, the assignee of the instant application recommends that a smoke detector also be included in the dining room (detector 212), the kitchen (detector 214), and the living room (detector 216). These detectors should also be interconnected with the others.

Figure 3:
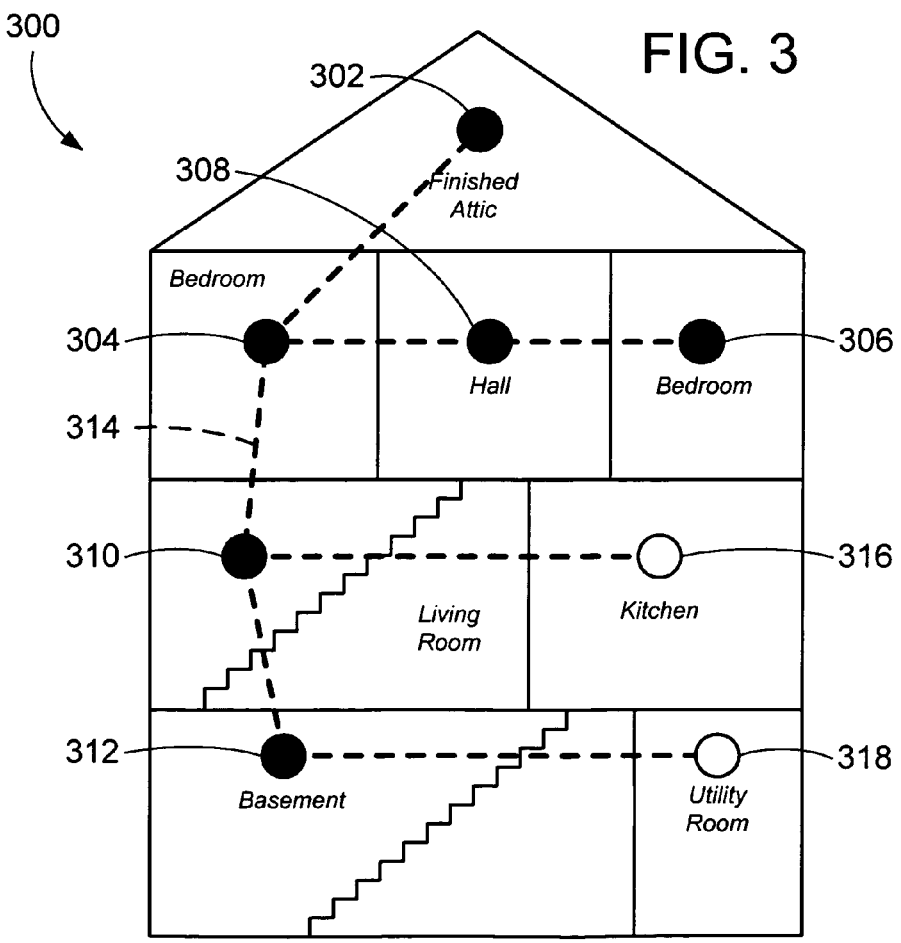
FIG. 3 is an exemplary smoke detector placement diagram for a two-story home.

FIG. 3 illustrates an exemplary two-story home 300 having both NFPA required and additional suggested smoke detectors installed therein. Specifically, the NFPA required smoke detectors include detector 302 in the finished attic, detector 304 and 306 in the bedrooms, detector 308 outside the sleeping area, and detectors 310 and 312 on every level of the two-story residence 300. As may be seen in this FIG. 3, the NFPA also requires that the smoke alarms be interconnected as illustrated by dashed line 314. The additional recommended smoke detectors include detector 316 in the kitchen and 318 in the utility room. These detectors should also be interconnected with the others.

While the NFPA describes the requirements for smoke detectors, the use of smoke detectors, the use of other hazardous condition detectors is also recommended. Indeed, many hazardous condition detectors currently include the ability to sense multiple hazardous conditions, e.g. smoke and CO. Therefore, the interconnected hazardous condition detector systems illustrated and discussed above could actually include any combination of smoke detectors, CO detectors, combination smoke and CO detectors, etc. Indeed, it is this very combination of different interconnected hazardous condition detectors that has led to the need for the system and method of the present invention.

Regardless of the actual layout and placement of the interconnected hazardous condition detectors, the system and method of the present invention will provide distinct advantages not recognized in the prior art. Specifically, the system and method of the present invention will provide a system of prioritization of different sensed hazardous condition alarms. This prioritization will ensure that each of the interconnected hazardous condition detectors will only sound the highest priority alarm condition sensed by any one of the interconnected hazardous condition detectors. This will minimize the possibility of confusion that may result of multiple alarms were sounded at the same time.

In the discussion that follows, a typical dwelling having smoke detectors, carbon monoxide detectors, and combination units having both smoke and carbon monoxide detection circuits will be discussed. However, those skilled in the art will recognize that the system of prioritization and method applicable thereto of the present invention will find applicability in other systems that may include other types of hazardous condition detectors. In such systems, as with the discussion to follow, the detectable hazardous conditions are prioritized in order of urgency and potential threat risk. Once this prioritization has been determined, the system and method of the present invention will ensure that only the highest level threat detected will be indicated to the occupants so that they will be made aware of the most urgent hazardous condition existing within the dwelling.

To further aid the occupants in determining the most urgent and appropriate course of action during a detected hazardous condition, the system and method of the present invention also allows the occupant to locate the source of the detected hazard. This trigger alarm locate functionality will silence all of the alarms from the hazardous condition detectors that are not currently sensing a hazardous condition. In this way, the occupant will be able to locate the detecting alarm, which will provide an indication of the location of the hazardous condition within the dwelling. With this information, the occupant will be able to choose a safe escape route that will not bring them in close contact with the hazardous condition if at all possible.

Figure 4:
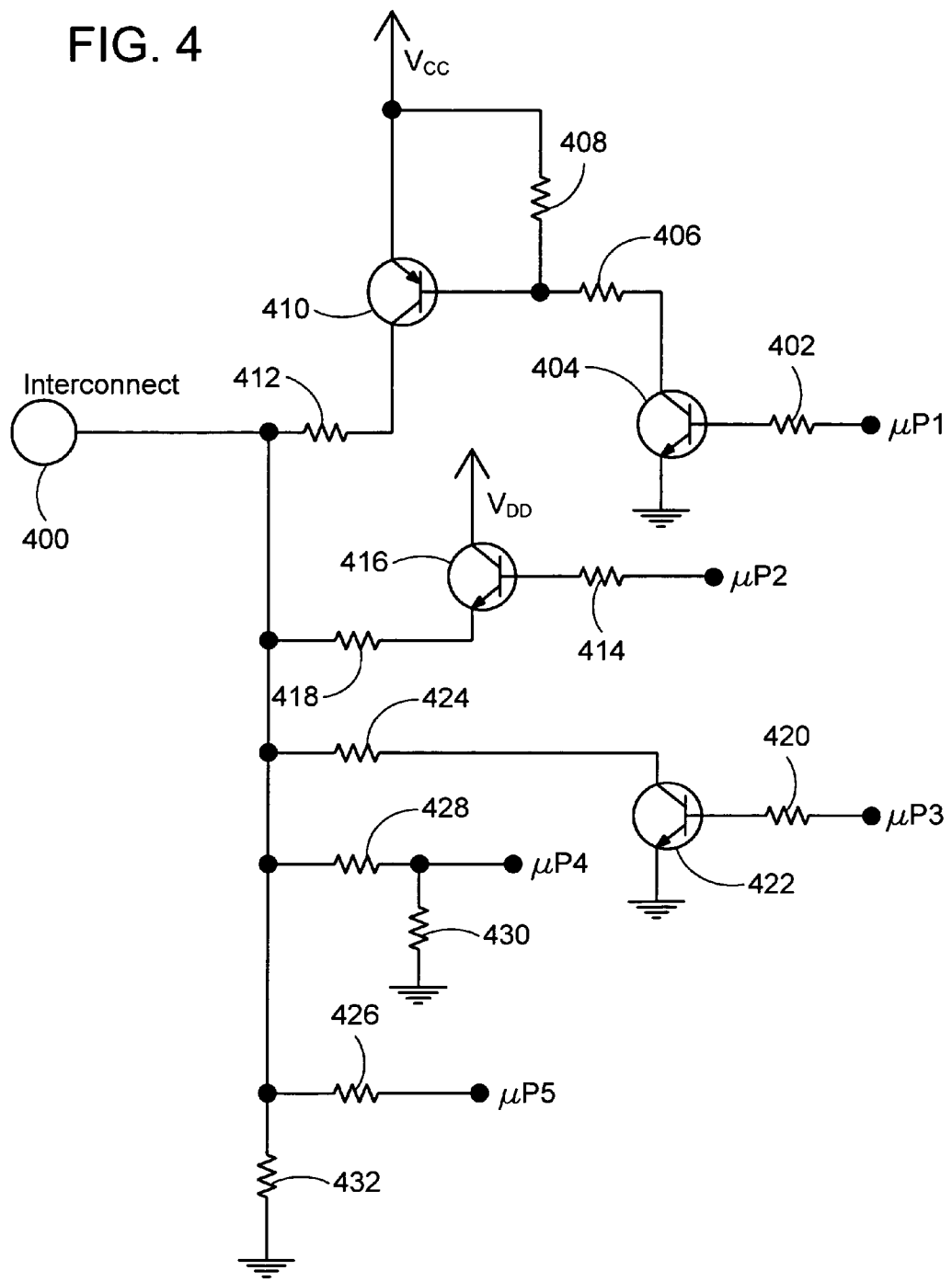
FIG. 4 is a schematic diagram of an interface circuit constructed in accordance with the teachings of the present invention.

In one embodiment of the present invention, this functionality is achieved through the inclusion of an interconnect interface circuit, such as that illustrated in FIG. 4. As indicated above, this embodiment of the interface circuit of the present invention is for a combination smoke and carbon monoxide detector, although one skilled in the art will recognize the ability to modify the circuit for the detection and alarming of other hazardous conditions in view of the following description. Therefore, the description and illustration of FIG. 4 should be taken exemplary only, and not as limiting to the scope of the present invention.

Turning specifically to FIG. 4, this interface circuit connects to the signal wire of a typical three wire interconnect 400 that is used to interconnect the hazardous condition detectors within a dwelling. The other hazardous condition detectors may be single condition detectors that include different interface circuits as are well known in the art. These "legacy" detectors will still function appropriately in conjunction with the output from the interface circuit of FIG. 4.

When the detection circuitry of a hazardous condition detector including the interface circuit of the present invention detects a smoke condition, which in this discussion is the highest priority message in the system of prioritization, the detector's microprocessor or microcontroller provides an output to μP1. This μP1 output, though resistor 402, will turn on transistor 404. Once this transistor 404 has been turned on, current from source $V_{cc}$ will flow through resistors 408, 406. This will then turn on transistor 410 to source the voltage $V_{cc}$ through resistor 412, 432 to the interconnect 400. In one embodiment of the present invention, the voltage $V_{cc}$ should be selected to be higher than the legacy smoke alarm signal that prior smoke alarms used to indicate that they had detected a smoke condition. These legacy alarms typically generate a 3 volt DC signal on the interconnect signal wire to cause the other interconnected smoke detectors to sound their alarm. In one embodiment, this voltage $V_{cc}$ is set at 9 volts DC. Since legacy smoke detectors simply look for a voltage above 3 volts DC to sound their smoke alarm, this high voltage output will result in all of the interconnected smoke detectors sounding their alarm.

By providing the highest priority alarm with the highest voltage on the interconnect signal wire, the system of the present invention ensures that any other communicated hazardous condition will be swamped out or overridden by the higher voltage generated for the higher priority detected hazardous condition. That is, the voltage magnitude selected for communication of each of the hazardous conditions via the interconnect signal wire are selected in order of their importance, with the highest priority message having the highest voltage output, the next highest priority message having the next highest voltage magnitude, etc. If any lower voltage signal is currently being communicated via the interconnect signal wire, the detection by any one of the interconnect hazardous condition detectors of a higher priority hazardous condition will result in that higher voltage being communicated to all of the hazardous condition detectors. When the interconnected hazardous condition detectors see the higher voltage, they will all sound the higher priority hazardous condition alarm.

Returning again to FIG. 4, once the hazardous condition detector's detection circuitry no longer senses the hazardous condition, the output µP1 to the interface circuit will be removed. Once this signal has been removed, transistors 404 and 410 will turn off, thereby removing the connection to the source $V_{cc}$ from the interconnect 400. In a preferred embodiment of the present invention, once the hazardous condition detector removes the hazardous condition detected signal from the interconnect 400, the microprocessor or microcontroller will energize output µP3. Once this output has been energized, transistor 422 will be turned on through resistor 420. This will pull down the interconnect voltage through resistor 424 to ground, ensuring that no residual voltage is left on the interconnect once the hazardous condition is no longer detected.

If the detection circuitry of the hazardous condition detector senses carbon monoxide, the microprocessor or microcontroller will energize output µP2 which, through resistor 414, will turn on transistor 416. Once transistor 416 has been turned on, the voltage supply $V_{DD}$ will be connected to the interconnect 400 through resistor 418. In a preferred embodiment of the present invention the source $V_{DD}$ is selected to be approximately 3.3 volts DC. However, since there is a 0.5 volt DC voltage drop across transistor 416, the output to the interconnect 400 will be 2.8 volts DC maximum. Since this 2.8 volt DC maximum voltage is lower than the legacy smoke detector interconnect signal of 3.0 volts DC, this output will not cause any of the legacy smoke detector devices to sound their alarm. Instead, only other carbon monoxide detectors or combination smoke and carbon monoxide detectors will sound their carbon monoxide alarm. In other words, the voltage magnitude of the carbon monoxide signal is not sufficiently high enough to cause the other smoke detectors to sound their smoke alarms.

Once the carbon monoxide condition is no longer sensed, the microprocessor or microcontroller will remove the signal from µP2, resulting in transistor 416 turning off. As with the smoke signal, the microprocessor or microcontroller may energize µP3 to turn on transistor 422 to make sure that the carbon monoxide signal on the interconnection signal wire is removed. However, even if the µP3 output is not energized, resistor 432 will pull the interconnect signal wire 400 down to 0 volts.

It is possible that multiple conditions may be sensed at the same time. As a result, one hazardous condition detector may detect a carbon monoxide condition and transmit the carbon monoxide alarm on the interconnect signal wire while a different detector may detect a smoke condition. Since the smoke condition has been determined to be the higher priority message of the two, this smoke message must override the carbon monoxide message on the interconnect signal wire.

To demonstrate this, assume that transistor 416 is on. The output voltage to the interconnect signal wire will then be 2.8 volts DC. If another detector detects a smoke condition it will turn on its equivalent of transistor 404, which will turn on its equivalent of transistor 410. The potential conducting through transistor 410 in the smoke detecting detector will drive the interconnect signal wire voltage potential higher than the potential output of the detector that is currently detecting carbon monoxide. This will put transistor 416 into a reverse bias condition, and force it off. Now, no other transistors are conducting and the interconnect potential is high enough to be interpreted by all interconnected detectors, including legacy smoke detectors, as having a smoke condition. All the detectors that are capable of doing so will then sound their smoke alarms.

While it is possible to utilize a single voltage sense circuit coupled to the interconnect signal wire 400 to determine the voltage magnitude of any signal transmitted thereon, the preferred embodiment of the present invention utilizes two separate inputs, µP4 and µP5, to provide discrimination of the voltage signals communicated on the interconnect 400. Each of these inputs is preferably coupled to a microcontroller input having a Schmitt trigger or like circuitry that will force a digital output for a range of analog input values. This greatly reduces the cost and complexity of the interface circuitry because most standard logic inputs for microcontrollers and the like include such circuitry. In this way, the microcontroller will be able to identify the interconnect potential by using only logic level inputs.

In this embodiment, the input µP5 is coupled to the interconnect 400 via resistor 426. The input µP5 preferably switches at a signal level corresponding to, in this embodiment, the carbon monoxide signal of 2.8 volts. For example, µP5 input may switch logic levels at a voltage of 1.5 volts DC. When the microcontroller sees this input, the microcontroller will know that a signal has been communicated on the interconnect signal wire. However, to determine whether this signal corresponds to a carbon monoxide signal or to a smoke signal, the input µP4 must also be checked. Specifically, the input for µP4 couples the interconnect 400 through a resistor divider network of resistors 428, 430. This resistor divider is set to allow the Schmitt trigger at input µP4 to transition at a voltage higher than that at µP5, but low enough so that the legacy smoke detector voltage signal will be recognized at this input. Specifically, the input µP4 must trigger when a legacy smoke detector communicates on the interconnect 400, but not when a carbon monoxide signal is present on the interconnect 400.

Utilizing these two inputs, the microcontroller can logically determine what, if any, alarm should be sounded based on the interconnect potential. If neither input has been triggered, no alarm be sounded. If the µP5 input has triggered but the µP4 has not, then the hazardous condition detector should sound its carbon monoxide alarm. However, if the µP4 input has triggered, regardless of the state of the µP5 input, the hazardous condition detector should sound its smoke alarm. As will be recognized by those skilled in the art, multiple inputs using different resistor divider networks can be used when multiple hazardous conditions may be sensed and alarmed.

Once one of the hazardous condition detectors has detected a hazardous condition and has communicated that information on the interconnect, all of the interconnected hazardous condition detectors will sound the appropriate alarm for the highest priority message corresponding to the highest priority hazardous condition. However, to enable the occupant to locate the source of the hazardous condition, the interface circuit of the present invention provides the ability to hush all of the interconnected alarms except for that (or those) detector that is actually sensing the hazardous condition.

Once the user has selected this feature, the microprocessor or microcontroller will energize output µP3 which, through resistor 420, will turn on transistor 422. This will result in the grounding, through resistor 424, of the interconnect signal wire 400. As a result, none of the interconnected hazardous condition detectors will be able to detect a voltage high enough on the interconnect signal wire to cause them to sound one of their hazardous condition alarms. For the detectors that are not also sensing the hazardous condition, this will result in those alarms being silenced. The occupant will then be able to determine the source of the detected hazardous condition by location of the sounding alarms. The occupants will then be able to determine an appropriate escape route or other remedial actions while avoiding the source of the hazardous condition.

Once the user disables this function, or no longer selects the mechanism to silence the interconnected detectors, the input μP3 will be removed and transistor 422 will turn off. That will then allow the interconnect 400 to return to its previous magnitude, assuming that the hazardous condition is still being detected by one of the detectors. This will then again result in all of the interconnected hazardous condition detectors sounding the appropriate alarm. This trigger alarm locate function greatly enhances the occupant's safety by allowing them to intelligently decide on an escape route or other appropriate measures based on the location of the detected hazardous condition.

Figure 5:
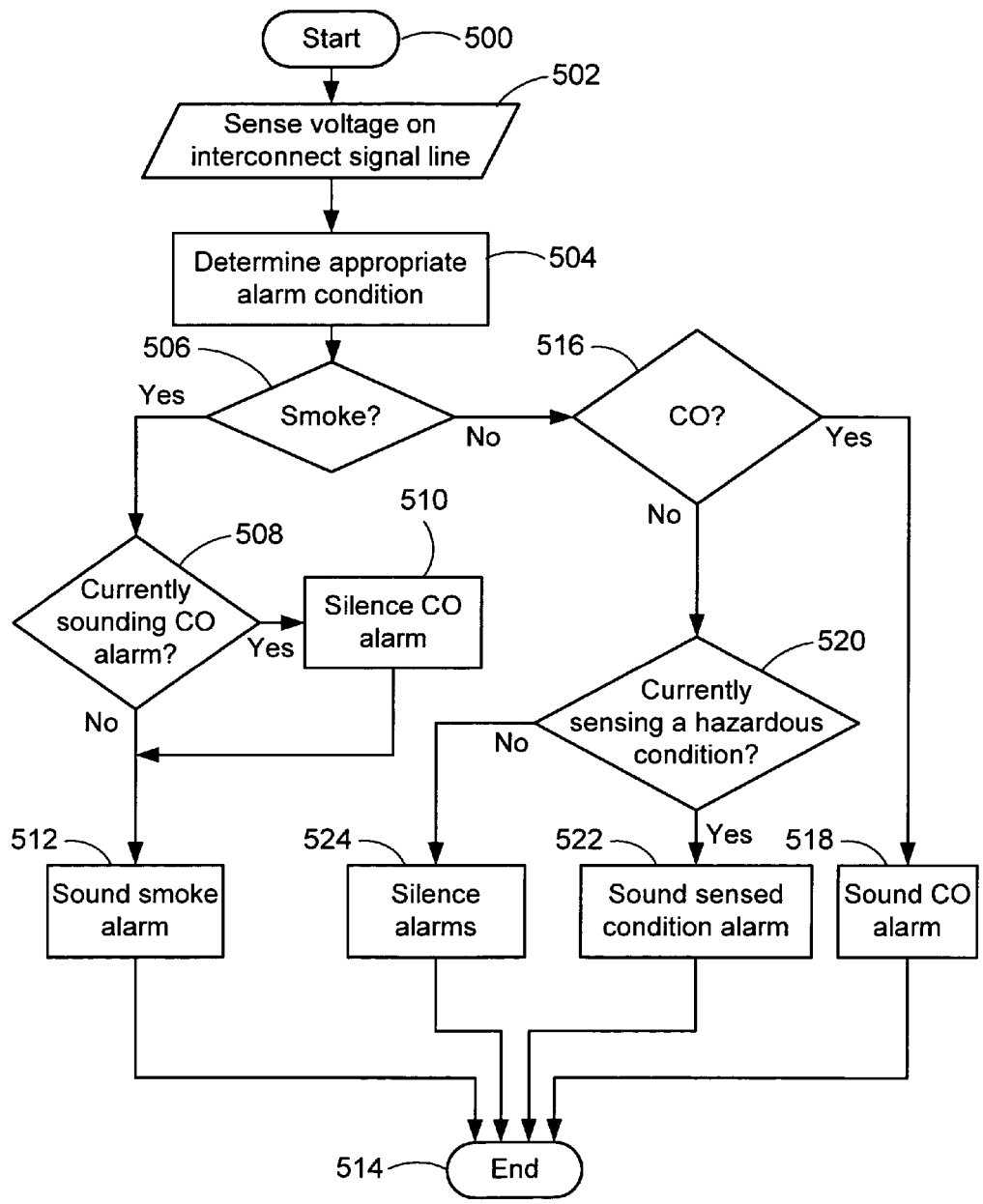
FIG. 5 is a simplified flow diagram illustrated an embodiment of a method of the present invention.

As illustrated in simplified flow diagrammatic form in FIG. 5, an embodiment of the method of the present invention begins 500 by sensing the voltage on the interconnect signal line at step 502. The receiving alarm then determines the appropriate alarm condition at step 504. If, at decision block 506 it is determined that a signal on the interconnect signal line is for a smoke condition, the receiving detector checks to see if it is currently sounding a carbon monoxide alarm at decision block 508. If it is currently sounding a carbon monoxide alarm, it will then silence that alarm at step 510. The receiving detector will then sound the smoke alarm at step 512 before ending 514. As may be seen, if the receiving detector is not currently sounding the carbon monoxide alarm at step 508, it will simply sound the smoke alarm at step 512.

However, if the received signal is not a smoke signal as determined by decision block 506, the receiving detector checks to see if the received signal corresponds to a carbon monoxide condition at decision block 516. If it is, the receiving detector will sound the carbon monoxide alarm at step 518 before ending 514. However, if the signal on the interconnect does not correspond to a carbon monoxide signal at decision block 516, the hazardous condition detector will check to see whether it is currently sensing any hazardous condition at decision block 520. If the receiving detector is not currently sensing a hazardous condition of its own, it will silence any alarms at step 524 before ending. This corresponds to the trigger alarm locate functionality. However, if at decision block 520 it is determined that the detector is currently sensing a hazardous condition, the receiving detector will sound the sensed condition alarm at step 522 before ending. In other words, if there is no signal on the interconnect signal wire, or if the signal on the interconnect signal wire is not a smoke or carbon monoxide signal, the receiving hazardous condition detector will only sound an alarm that is associated with a condition that it has detected.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An interface circuit for a hazardous condition detector, the hazardous condition detector being capable of communicating with other hazardous condition detectors via an interconnect signal wire, comprising:
   a first circuit adapted to apply a first voltage to the interconnect signal wire upon detection of a first hazardous condition; and
   a second circuit adapted to apply a second voltage to the interconnect signal wire upon detection of a second hazardous condition; and
   wherein the first hazardous condition is of greater immediate threat than the second hazardous condition; and
   wherein the first voltage has a magnitude greater than the second voltage.

2. The circuit of claim 1, wherein the second circuit is turned off when the first circuit applies the first voltage to the interconnect signal wire.

3. The circuit of claim 2, wherein the first circuit comprises a transistor, and wherein the transistor is back biased when the first circuit applies the first voltage to the interconnect signal wire.

4. The circuit of claim 1, wherein the first circuit comprises a transistor, and wherein the transistor is back biased into an off condition when a third voltage from a legacy smoke detector is present on the interconnect signal wire.

5. The circuit of claim 1, wherein the first voltage is at least equal to a third voltage from a legacy smoke detector.

6. The circuit of claim 5, wherein the first voltage is greater than a third voltage from a legacy smoke detector.

7. The circuit of claim 1, further comprising at least a first input circuit coupled to the interconnect signal wire to monitor the voltage present thereon.

8. The circuit of claim 7, further comprising a second input circuit coupled to the interconnect signal wire to monitor the voltage present thereon.

9. The circuit of claim 8, wherein the first input circuit comprises of a resistor, and the second input circuit comprises a resistor divider.

10. The circuit of claim 1, further comprising a trigger alarm locate circuit adapted to pull down the voltage on the interconnect signal wire below the second voltage.

11. A method of prioritizing hazardous condition messages for hazardous condition detectors interconnected by an interconnect signal wire, comprising the steps of:
- determining a level of urgency for each of the hazardous condition which the hazardous condition detector can detect;
- applying a first voltage to the interconnect signal wire when a first hazardous condition of a first urgency is detected; and
- applying a second voltage to the interconnect signal wire when a second hazardous condition of a second urgency is detected; and
- wherein the second hazardous condition is of a lesser urgency than the first hazardous condition; and
- wherein the first voltage is greater than the second voltage.

12. The method of claim 11, further comprising the step of locating a triggering alarm.

13. The method of claim 12, wherein the step of locating comprises the step of pulling down the voltage on the interconnect signal wire.

14. The method of claim 11, wherein legacy smoke detectors apply a third voltage to the interconnect signal wire when they detect smoke, and wherein the step of applying a first voltage comprises the step of applying a first voltage at least equal to the third voltage to the interconnect signal wire.

15. The method of claim 14, wherein the step of applying the first voltage comprises the step of applying a first voltage greater than the third voltage to the interconnect signal wire.

16. The method of claim 14, wherein the step of applying a second voltage comprises the step of applying a second voltage less than the third voltage.

17. A method of prioritizing hazardous condition alarms sounded based on information transmitted on an interconnect signal wire, comprising the steps of:
- sensing a voltage on the interconnect signal wire; and
- sounding an appropriate alarm condition based on a magnitude of the voltage.

18. The method of claim 17, wherein the step of sounding an appropriate alarm comprises the steps of:
- sounding a first alarm when the magnitude is greater than a first level; and
- sounding a second alarm when the magnitude is greater than a second level and less than the first level.

19. The method of claim 18, wherein the step of sounding an appropriate alarm further comprises the step of sounding no alarm when the magnitude is less than the second level.

20. The method of claim 19, wherein the step of sounding no alarm comprises the step of sounding an alarm based on a locally detected hazardous condition.

21. The method of claim 18, wherein the step of sounding the first alarm comprises the step of silencing the second alarm.

\* \* \* \* \*